MULTIPLEX SIGNAL TRANSFER CIRCUIT

Filed May 22, 1967 3 Sheets-Sheet 1

INVENTOR
H. S. FEDER
BY
R. C. White
ATTORNEY

MULTIPLEX SIGNAL TRANSFER CIRCUIT

Filed May 22, 1967 3 Sheets-Sheet 3

United States Patent Office 3,521,000
Patented July 21, 1970

3,521,000

MULTIPLEX SIGNAL TRANSFER CIRCUIT

Herbert S. Feder, Matawan, N.J., assignor to Bell Telephone Laboratories, Incorporated, Murray Hill, N.J., a corporation of New York Filed May 22, 1967, Ser. No. 640,224
Int. Cl. H04j *3/00*
U.S. Cl. 179—15 15 Claims

ABSTRACT OF THE DISCLOSURE

A time division multiplex signal transfer circuit for a communication system is disclosed in which signals are differentiated and the resultant slope is sampled for transmission between stations in communication. The sample is integrated at the receiving station to provide a line segment approximation of the original signal. Sampling is at a variable rate determined by the bandwidth of the signal to be transmitted and/or by variations in the signal being transmitted.

BACKGROUND OF THE INVENTION

This invention relates to circuits for transferring signals on a time division multiplex basis in a communication system.

A time division multiplex communication system includes a common transmission bus or highway which is shared in time by a plurality of pairs of stations communicating via distinct time channels in the highway. Time sharing may be utilized, for example, in a telephone system wherein the respective connections of a plurality of communicating pairs of telephones are completed via a single transmission highway. A system of this type is described in R. C. Gebhardt et al. Pat. 3,225,-144, issued Dec. 21, 1965.

Time sharing, or time division multiplexing, as employed in the Gebhardt et al. system, implies that each pair of stations in communication is assigned a time channel which corresponds to a frequently recurring discrete interval of time or time slot in a repetitive cycle of time slots during which information may be interchanged via the common highway. Intermediate the cyclic appearances of a time slot assigned to a particular pair of stations, the highway is available to other communicating pairs of stations in their respective preassigned time slots. Thus in each cycle of time slots or frame, a sequence of information samples, corresponding to all communicating pairs of stations, is transmitted over the highway.

The accurate reproduction of sampled information in such systems depends primarily upon the strict minimization of signal transfer losses. The sampling technique utilized in the aforementioned Gebhardt et al. patent is based upon a principle referred to as resonant transfer. Theoretically, resonant transfer is accomplished without loss or crosstalk. However, in practice, signal leakage through imperfect gates and signal trapped in parasitic capacitance in the highway may produce a harmful crosstalk level and imperfect signal transfer in large systems.

In accordance with this principle, sampling of the information at a particular station is achieved by operation of a switch or gate intermediate the station and the highway. The lengh of time that the gate remains operated is determined by the time required for transfer of an entire information sample in analog form through the gate. For proper reconstruction of the original signals at the receiving end of the highway, it is necessary that each signal be sampled at more than twice the frequency of the highest signal frequency expected to be transmitted. The interleaved amplitude modulated samples derived from each sending station are sorted out and applied to individual low pass filters at the corresponding receiving stations. The output from the low pass filters is normally an accurate reproduction of the original signals.

The fixed sampling rate employed in such systems necessarily estatblishes a maximum system loading, despite the fact that even in a fully loaded system information is being transmitted for only a fraction of the time. The signal bandwidth has an upper limit which determines the sampling rate. Any signal of wider bandwidth cannot be accommodated by the system without distortion, while signals of narrower bandwidth utilize the facilities inefficiently. The difficulty is magnified when a fixed sampling rate is required to transmit broadband and narrowband signals concurrently, e.g., television and speech. In this instance the sampling rate must be established so as to accommodate the television signal bandwidth, which rate in turn would prove extremely inefficient for the speech bandwidth signals.

The ability to transfer signals at a nonuniform rate would be beneficial in the foregoing instances. Furthermore, signal samples transferred in other than analog form would tend to reduce the distortion otherwise encountered. Thus system known in the art in which signal samples are encoded for transmission, e.g., pulse code modulation and delta modulation, may realize far superior signal transmission quality. However, such arrangements require costly coding equipment, and complex system synchronization problems are encountered in assuring that the coded signal samples reach the proper destination at the proper time.

SUMMARY OF THE INVENTION

In accordance with one embodiment of my invention, signal distortion in a time division multiplex communication system is reduced in an efficient and economical manner by the provision of a differentiating circuit in each station's outgoing signal path and an integrating circuit in each station's incoming signal path. Thus the slope of the signal, rather than the signal itself, is sampled. The slope samples are transmitted over the highway and through the sampling gate of the destination station, which gate is operated concurrently with the sampling gate of the originating station. The signal samples then are stored and subsequently integrated to approximate linear segments of the incoming signal. When the slope of the signal is sampled at a sufficiently rapid rate, a reproduction of high fidelity can be achieved.

By utilizing this sampling method, stations transmitting or receiving signals of different bandwidths may incorporate identical terminal facilities comprising simple differentiation and integration circuits. This in turn leads to another embodiment of my invention in which a variable sampling rate is employed. Thus wideband signals may be sampled at a relatively higher rate than narrowband signals sharing the same transmission channel. The maximum bandwidth signal establishes the system sampling rate as in previous systems. However, lesser bandwidth signals are sampled less frequently, so that a dramatic increase in system capacity can be achieved.

In accordance with another embodiment of my invention, advantage is taken of the fact that signals are available for transmission only a fraction of the time. This fact is turned to advantage by permitting utilization of the transmission highway in a given time channel only when a signal sample is available. Thus a further variation in the sampling rate is achieved. At low frequencies fewer samples are required than at higher frequencies within a particular signal bandwidth.

For this purpose a feedback loop, corresponding to the receiving circuit is an incoming signal path, is included in the outgoing signal path for each station. The differentiated outgoing signal sample is reconstructed in this feedback loop and subsequently compared with the next outgoing signal. If the comparison reveals a change in signal which is not sufficient to produce a substantial distortion in the reconstructed signal, the sampling gate blocks the next outgoing signal, and the sampling gates for the next pair of communicating stations are enabled to transfer a signal sample in the same time channel. Thus time channels are utilized only for the transmission of signal samples vital to the communication in progress. Sampling would not occur, for example, during pauses or when an insignificant change in the level of the outgoing signal is detected.

DETAILED DESCRIPTION

Figure 1:
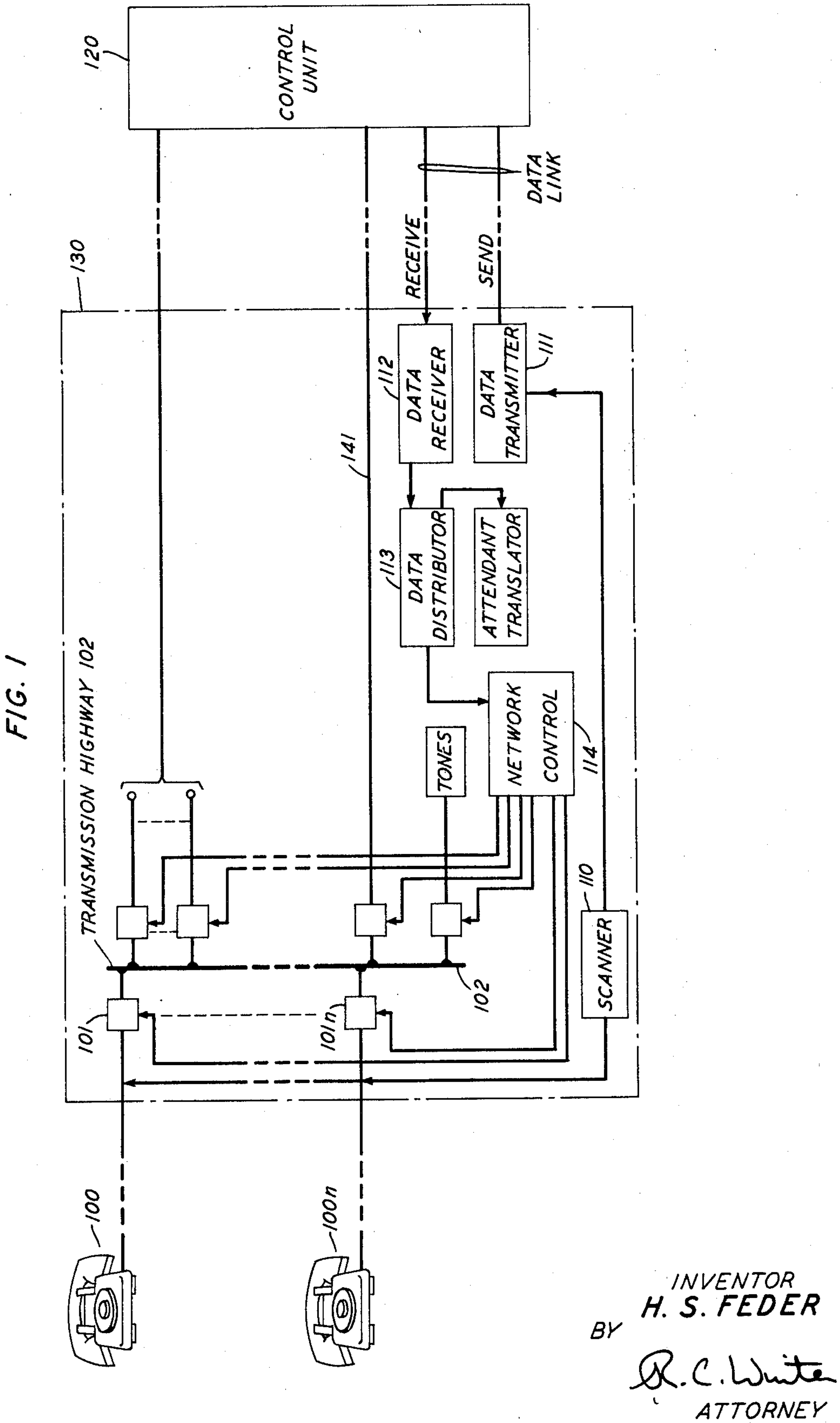
FIG. 1 is a schematic representation in block diagram form of a telephone system in which the various embodiments of this invention may be employed.

Turning now to the drawing, the basic elements of a time division communication system in which my invention may be incorporated are depicted in FIG. 1. This system, particularly adapted to telephone communication, is disclosed in the aforementioned R. C. Gebhardt et al. patent, but for purposes of understanding the overall system operation, a brief description of this arrangement is provided herewith.

The system contains the usual transmission circuits, switching network, and control circuits. In this instance the majority of the control functions may be performed at a control unit 120 remote from the switching facilities for stations **100–100*n* in switch unit 130**.

The system is operated on a time division multiplex basis in which each pair of stations in communication, such as 100 and **100*n*, is assigned a particular sampling period or time slot in a recurrent cycle of time slots. Upon each occurrence of the assigned time slot, a sample of information is transmitted from station 100 through the corresponding sampling gate 101, over common highway 102 and through sampling gate 101*n* to station 100*n*** and vice versa.

Time division switching is based on the principle that periodic samples of an information signal are sufficient to completely define the signal and that such samples, obtained concurrently from a number of different sources, may be transmitted in a regular sequence in distinct time channels over a time shared highway. Thus the plurality of stations **100–100*n* are connected to the common highway 102 through the corresponding line gates 101–101*n* which are operated on a selective basis for a predetermined time interval in a recurrent cycle of time intervals. When a pair of sampling gates is closed simultaneously for the prescribed time interval, a sample of the information available at each of the corresponding stations may be transferred to the opposite station in the assigned time channel over the common highway 102**. In this fashion a connection between two stations in communication is established which, although physically connected for only a small fraction of the time, appears to be continuous because of the rapidity of the sampling and the smoothing action of filter circuitry in the respective station line circuits.

The operation may be understood upon consideration of a typical call connection. Assume station 100 requests service. The change of status resulting from activation of the station, termed "off-hook," is recognized by scanner 110 which, in turn, formulates a message containing the corresponding station designation and the new supervisory state. This information is transmitted to control unit 120 via data transmitter 111. Control unit 120, recognizing that there is no current call established which involves this particular station, determines that the off-hook indication is a request for service and proceeds to set up a dialing connection. For this purpose a message is sent from control unit 120 via the receive leg of the data link specifying that station 100 should be connected to a preselected digit trunk. This message is received by data receiver 112 and transmitted to network control 114 via data distributor 113. Network control 114 in turn stores this message and translates it periodically in order to effect connection of the appropriate station to the digit trunk via highway 102 in a predetermined time slot. At the same time control unit 120 proceeds to connect the digit trunk 141 to a digit receiver, not shown, at the control unit 120 so as to transmit dial tone via the digit trunk to station 100.

Station 100 now proceeds to dial or otherwise transmit the digits representing the called station. Upon completion of dialing, control unit 120 acts to remove the connection to the digit trunk and to establish instead a ringing connection to the called station with audible ringing returned to calling station 100. When the called station answers, an off-hook message is sent to control unit 120 which in turn terminates ringing and establishes the talking connection via highway 102.

Figure 2:
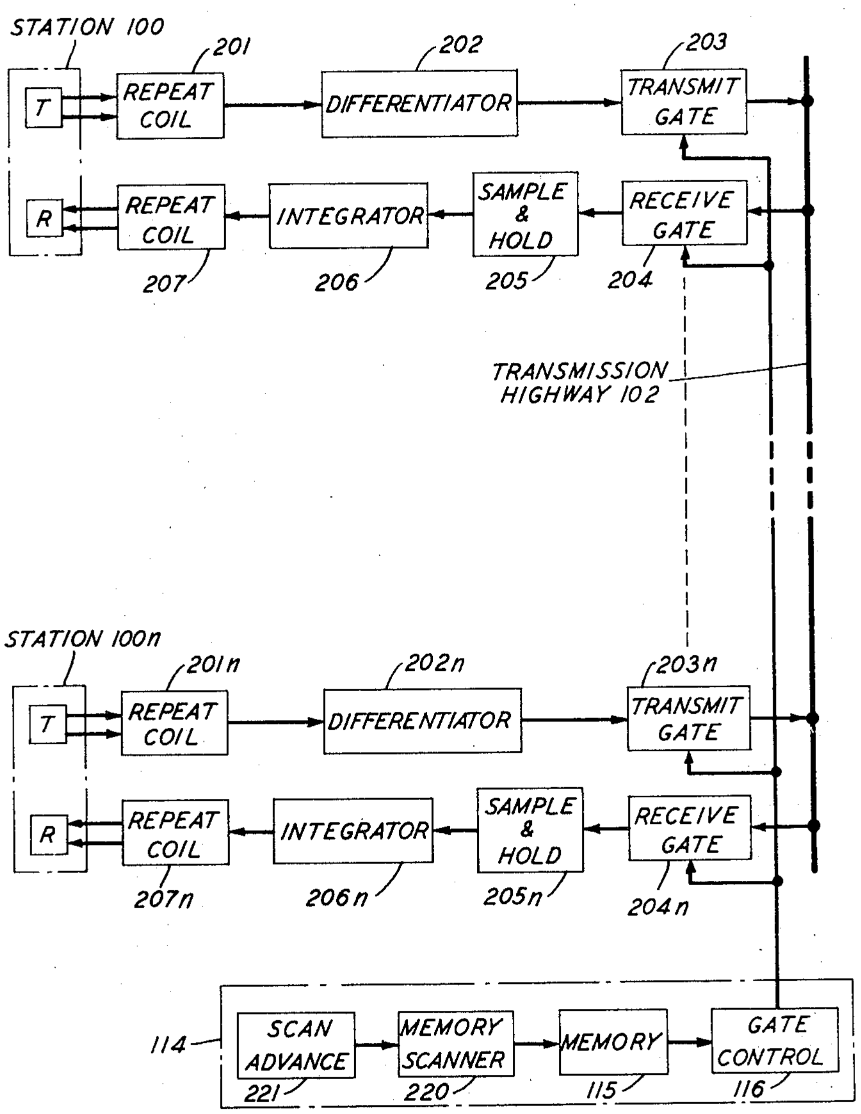
FIG. 2 depicts control and station line circuit elements in the communication system of FIG. 1 which are of interest with regard to certain embodiments of this invention.

Network control 114, as depicted in FIG. 2, includes a memory 115 which remembers the calls in progress. Memory 115 is coupled to gate control 116 which activates sampling gates in the switching network in accordance with stored address translations received from memory 115. New information from data distributor 113, FIG. 1, is gated into memory 115, FIG. 2, during a write cycle when the number of a particular time slot agrees with a particular stored address. During a read cycle, information is gated from memory 115 to gate control 116. The output of gate control 116 is directed simultaneously to the selected pair of sampling gates, thus effecting their operation during a predetermined time interval.

The system elements depicted in FIG. 2 are utilized in the particular signal transfer operations required by my invention in this specific embodiment. Stations **100–100*n* are indicated as four-wire terminals, each having a distinct pair of wires for transmitting signals from a transmitter T and a second pair of wires for carrying signals to a receiver R. Each station line circuit comprises a repeat coil such as 201 and 201*n* and a sampling gate such as 203 and 203*n* for coupling outgoing signal samples from the transmitter T of the corresponding one of the stations 100–100*n* to highway 102. Similarly, the corresponding one of the sampling gates 204–204*n* and repeat coils 207-207*n* transfer an incoming signal sample to the receiver R at the corresponding one of the stations 100–100*n***.

Unlike prior art arrangement in which the signal itself was sampled for transmission, either in analog or various coded forms, the arrangement in accordance with this embodiment of my invention provides a differentiator such as 202 and **202*n* in the outgoing path of each of the corresponding stations 100–100*n* such that the signal slope is sampled by the corresponding one of the gates 203–203*n* for transmission over highway 102. This signal slope sample is transferred through the proper one of the receive gates 204–204*n* corresponding to the receiving one of stations 100–100*n* and is retained in the corresponding one of the sample and hold circuits 205–205*n* for subsequent reconstruction of the original signal by the corresponding one of the integrators 206–206*n*. The signal, now restored to its original form, is applied through the appropriate one of the repeat coils 207–207*n*** to the receiving station.

The operation in other respects corresponds to that depicted in the system of FIG. 1. However, for sake of clarity, a typical call connection is considered hereinafter. It is assumed that station 100 is connected to station 100$n$ and a conversation is in progress, the operations necessary to the establishment of the call having been completed previously. Thus, memory 115 now contains the designations of the corresponding transmit gates 203 and 203$n$ and receive gates 204 and 204$n$ in positions which are interrogated by memory scanner 220 during assigned time slots.

These designations are read out to gate control 116, which in turn translates them and enables the corresponding transmit and receive gates in the assigned time slots. For example, if time slots 1 and 8 are assigned to this call, gate control 116 will enable transmit gate 203 and receive gate 204$n$ in time slot 1 and will enable transmit gate 203$n$ and receive gate 204 in time slot 8. The result is a transfer of a signal slope sample from station 100 to station 100$n$ in time slot 1 of each cycle and the transfer of a signal slope sample from station 100$n$ to station 100 in time slot 8 of each cycle via transmission highway 102.

In this embodiment of the invention, memory scanner 220 provides a sequential readout of memory 115, which readout is controlled automatically by a clock driven counter in scan advance circuit 221.

Figure 3:
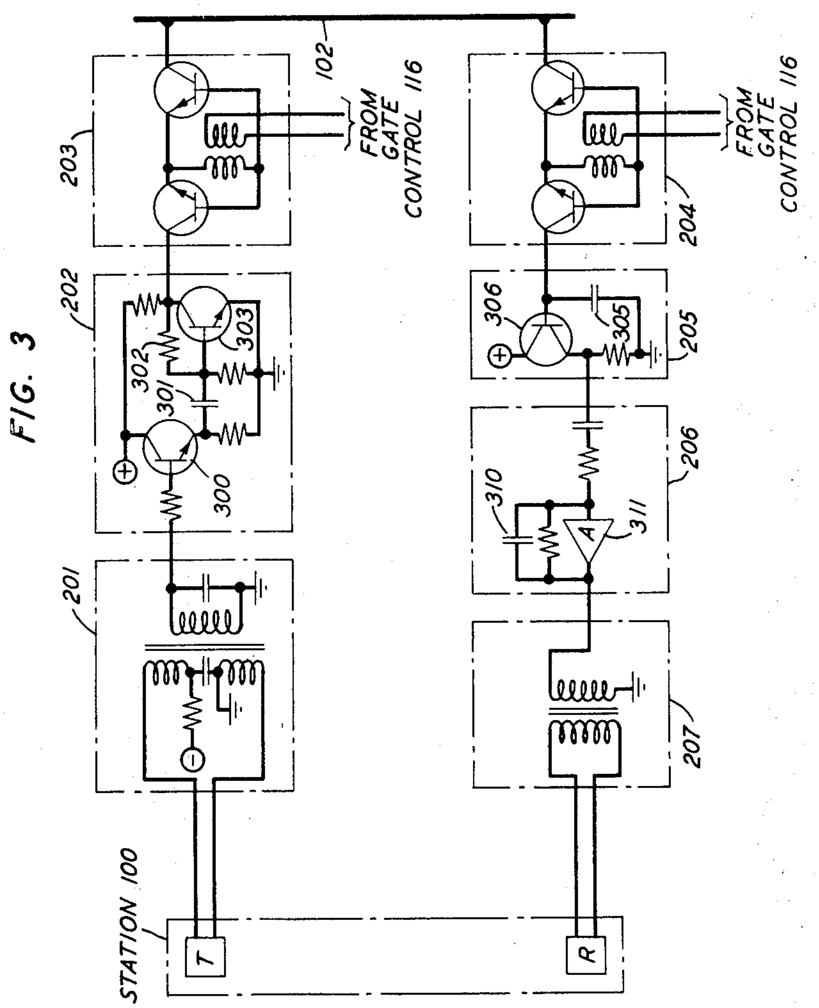
FIG. 3 illustrates in schematic form elements of one station line circuit depicted in FIG. 2.

The particular form of signal transfer may be understood from consideration of the detailed circuitry illustrated in FIG. 3. A signal at transmitter T of station 100 is transferred through repeat coil 201, which in this instance serves merely to isolate the talking battery from the gate circuits and common equipment, as is known in the art. Differentiator 202 receives the signal from repeat coil 201 and provides the desired signal slope output to transmit gate 203.

The differentiator may comprise the usual series connected capacitor and resistor, with the resistor shunted by a feedback amplifier for providing a signal proportional to the derivative of the voltage across the capacitor. In this instance the outgoing signal is applied to emitter follower 300, having its output connected to differentiating capaictor 301 which, in turn, is connected to resistor 302 and to the base of transistor 303. The output signal slope at the collector of transistor 303 is then applied to transmit gate 203.

Each of the sampling gates, including transmit gates 203–203$n$ and receive gates 204–204$n$, may comprise a pair of transistors connected back-to-back in series in the signal path. The signal terminals of the gate 203 are the two collector regions, one of which is connected to differentiating circuit 202 and the other of which is connected to transmission highway 102. Accordingly, regardless of the polarity of the voltage impressed on the gate, one of the transistors has its collector reverse biased, thereby presenting a high series impedance in the signal path. Control of the gate is effected by driving a current from the common base connection to the common emitter connection. The gate control signal, provided by gate control 116, is transformer coupled to the gate. The duration of the control pulse determines the operate time for the gate, thereby defining a time channel in highway 102.

A signal slope sample, transferred through receive gate 204, is stored on capacitor 305 in sample and hold circuit 205. The stored signal is then applied to integrator 206 through transistor 306. The integrator may comprise the familiar integrating network in which the capacitor 310 is shunted by feedback amplifier 311 to produce an output voltage proportional to the integral of the signal received from sample and hold circuit 205. Thus integrator 206 reconstructs the original signal by creating a series of line segments which approximate the signal. The integrator itself acts as a filter to some extent and smooths these line segments for a reasonable approximation of the original signal, as coupled through repeat coil 207 to receiver R in station 100.

Adequate fidelity may be obtained with this arrangement by sampling at a rate greater than four times the signal frequency. This compares with prior art arrangements in which the sampling rate is adjusted to be at least twice the signal frequency. However, the sampling rate must be established in prior art systems to accommodate the highest expected signal frequency and, due to the fact that filtering is necessary in the transmission and reception circuitry, this sampling rate cannot be varied to accommodate lower frequency signals despite the fact that a lower sampling rate would be sufficient to transfer the lower frequency signal without loss of fidelity.

In accordance with this embodiment of my invention, use of the unique signal slope sampling arrangement permits the use of a variable sampling rate for different frequency input signals. Consider, for example, that station 100 in FIG. 2 is transmitting a signal having a bandwidth of 18 kilohertz and that station 100$n$, with which it is in communication, is transmitting a signal having a bandwidth of only 2 kilohertz. Heretofore conventional system arrangements would have required the establishment of a fixed sampling rate of twice the highest frequency to be transmitted through the system, or 36 kilohertz in this instance for a $$\frac{1}{36 \text{ kHz.}}=28$$

microsecond frame. Thus, a 0.5 microsecond time channel would allow for concurrent transmission of a maximum of 56 of either the 36 kHz. or the 2 kHz. signals or any combination thereof.

In accordance with this embodiment of my invention, the requisite sampling rate for transmission of the 18 kilohertz bandwidth signal from station 100 would be approximately 72 kilohertz, while the sampling rate for the 2 kilohertz bandwidth signal provided by station 100$n$ would be 8 kilohertz. In this instance the frame interval established by the maximum bandwidth signal sampling rate would be $$\frac{1}{72 \text{ kHz.}}$$

or approximately 13.9 microseconds. Thus a sample of the 18 kHz. signal is transmitted from station 100 to station 100$n$ in an assigned time slot of each frame. Since station 100$n$ is transmitting a 2 kHz. bandwidth signal, it need only be sampled for transmission in each $$\frac{1}{8 \text{ kHz.}}=125$$

microsecond interval, or in every ninth frame. Thus, a sample of the 2 kHz. signal is transmitted from station 100$n$ to station 100 in an assigned time slot of each ninth frame.

By utilizing this variable sampling technique a 0.5 microsecond time channel would permit a maximum of 28 of the 18 kHz. bandwidth signals or 252 of the 2 kHz. bandwidth signals or various combinations of the two types, e.g., 7 of the 18 kHz. type and 189 of the 2 kHz. type for a total of 196. By contrast a system utilizing the fixed sampling technique could transmit a maximum of only 56 signals irrespective of bandwidth.

Memory 115 may be arranged to read out appropriate gate control information to achieve this variable sampling rate as known in the art. For example, appropriate delay devices may be included in the memory 115 storage or write-in path. A retrieved designation is normally returned to the same address location in memory 115 from which it was retrieved so as to be available for retrieval in the next frame. A designation which is to be made available in every ninth frame, instead of every frame will contain an indication of this fact. This indication or tag will direct the retrieved designation to a nine frame delay device rather than directly back to the memory. The manner of memory scan thus is unchanged.

Figure 4:
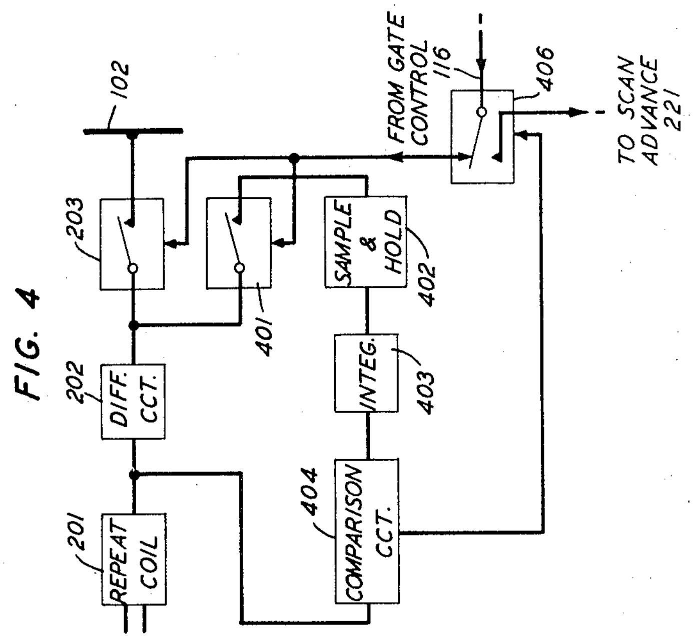
FIG. 4 depicts in block diagram form the transmitting portion of a station line circuit suitable for use in another embodiment of the invention.

Employment of the arrangement illustrated in FIG. 4 in the transmitting path of each station will permit another type of variable sampling in accordance with another embodiment of my invention. In effect, the circuitry contained in the receive path of FIG. 3 is incorporated in a feedback loop from the output of the differentiator 202 via gate 401, which is controlled in parallel with transmit gate 203. The feedback apparatus, including sample and hold circuit 402 and integrator 403, terminates in comparison circuit 404, which serves to compare the reconstructed signal sample with the signal currently being provided by the source through repeat coil 201. A simple analog signal comparison circuit, as known in the art, will suffice. Switch 406 normally directs signals from gate control 116 to the transmit gate 203 and feedback gate 401 in parallel. A particular output of comparison circuit 404 will operate switch 406 so as to direct the gate control signal to scan advance circuit 221. Switch 406 is illustrated as a single pole, double throw mechanical switch but, due to the speed requirements, a solid state counterpart, as known in the art, would be utilized herein.

This arrangement permits variable sampling based upon variations in the original signal. Thus if there is no significant variation in the signal over a frame period, the time slot allocated to the sending station will be assigned to the next sending station in the sequence. In this fashion highway 102 will be utilized at its maximum level, viz., all time slots will be occupied by information bearing signal samples.

Consider, for example, that a sending station provides a voice signal which varies in frequency over a considerable range and is followed by a lengthy pause in which no signal is provided. In the presence of the voice signal, differentiator 202 provides a signal slope sample which will be transmitted through gate 203 and over highway 102 in the assigned time channel. Since gate 401 is enabled concurrently with gate 203 upon receipt of the signal from gate control 116 through switch 406, the signal slope sample is also provided to the feedback network which in turn applies the reconstructed original signal to comparison circuit 404. In this example, it is considered that the voice signal has changed perceptibly in the interim, such that comparison circuit 404 detects a significant difference and inhibits its output. Thus, the signal slope is again sampled in the next appearance of the assigned time slot and applied to highway 102 through gate 203.

We will now assume that the reconstructed signal applied to comparison circuit 404 matches the signal currently being applied to differentiator 202. In this event, comparison circuit 404 provides an output signal which enables switch 406 to apply the gate control signal to scan advance circuit 221 and to disable transmit gate 203 and feedback gate 401. The resultant scan advance signal in turn forces memory scanner 220 to read out the next pair of station designations in the same time slot. Gate control 116 thereupon enables the corresponding sampling gates to permit a sample to be transmitted in the same time channel from the second pair of stations.

With feedback gate 401 open, the signal subsequently reconstructed by the feedback loop falls to zero, such that comparison circuit 404 will again detect a difference between the outgoing signal and the reconstructed signal. Thus, the comparison circuit output is again inhibited, and the normal sampling operation resumed in the next frame.

It may be noted that during a pause in voice transmission the reconstructed signal will match the outgoing signal. As a consequence comparison circuit 404 will provide an output to maintain switch 406 in the "gates disabled" position so that the corresponding station will not be sampled during the pause.

It is estimated that twenty nanoseconds would be required for interrogation of a line if no sample is transmitted. If, in fact, comparison circuit 404 indicates that a sample should be taken, memory scanner 220, FIG. 2, will be inhibited by scan advance circuit 221 for the full time slot, duration, viz, 0.5 microsecond in the previous example, to permit transfer of a signal sample between a pair of stations in communication. Thus, a 28 time slot frame may be completed in a minimum of 560 nanoseconds (28 x 20), if no line interrogated in that frame requires transmission of a signal sample, and in a maximum of 14 microseconds (28 x 0.5) if every line has a sample to transfer in that frame.

In this fashion valuable time on the common highway is not wasted for pauses, etc., thereby permitting the system to accommodate more simultaneous communications on the same highway. It is estimated that the highway capacity may be increased by 60 percent with this approach. Thus a frame of 45 time slots rather than the 28 time slots of the example would be available for assignment. If overload conditions should prevail, the quality of each conversation may be impaired slightly, viz., the comparison margins expanded, but service may continue for the increased number of simultaneous communications. Furthermore, since the order of appearance of signal samples for each communication is scrambled on the highway, adjacent channel crosstalk is attenuated.

It is to be understood that the above-described arrangement is illustrative of the applications of the principles of the invention. Numerous other arrangements may be devised by those skilled in the art without departing from the spirit and scope of the invention.

What is claimed is:

1. A signal transfer circuit comprising a plurality of transmitters, a plurality of receivers, a transmission highway, means for selectively connecting said transmitters and said receivers to said highway during distinct time intervals, means for differentiating a signal from one of said transmitters to obtain a slope signal, means for transferring a sample of said slope signal to one of said receivers via said highway and means at said receiver for reconstructing said signal comprising means for integrating said slope signal sample.

2. A signal transfer circuit comprising differentiating means, storage means, gating means, means applying a signal to said differentiating means to obtain a slope signal, means for activating said gating means to transfer a sample of said slope signal from said differentiating means through said gating means to said storage means and means connected to said storage means for reconstructing said signal from said stored sampled slope signal.

3. A signal transfer circuit in accordance with claim 2 wherein said reconstructing means comprises a first integrator.

4. A signal transfer circuit in accordance with claim 3 and further comprising a second integrator connected to said differentiating means, means for comparing said signal with the output of said second integrator, and means for controlling the operation of said gating means in accordance with the output of said comparing means.

5. A time division multiplex communication system comprising a plurality of transmitting lines, a plurality of receiving lines, differentiating means terminating each of said transmitting lines, storage means terminating each of said receiving lines, a common transmission highway, gating means for selectively connecting one of said transmitting lines and one of said receiving lines coincidentally to said common highway, means for applying a signal to said differentiating means, said differentiating means being operative to produce a slope signal corresponding to said applied signal, means for enabling said gating means for a time interval sufficient to transfer a sample of the slope signal from said transmitting line to said receiving line storage means and means in said receiving line for integrating the content of said storage means to provide a line segment approximation of said signal from a transferred sequence of said slope signal samples.

6. A time division multiplex communication system in accordance with claim 5 wherein said enabling means comprises a network control having a memory containing the addresses of each pair of lines in communication, a memory scanner for retrieving said addresses in a repetitive sequence, gate control means for translating said retrieved addresses and for applying enabling signals to the corresponding gating means, and means for advancing said scanner to the next memory address.

7. A time division multiplex communication system in accordance with claim 6 and further comprising means in each of said transmitting lines for controlling said scanner advancing means.

8. In a communication system, a signal transfer circuit comprising a plurality of stations each having a transmitter and a receiver, a common highway and gating circuits for connecting a different one of said transmitters and the receiver with which it is in communication to said common hghway during each distinct time slot in a repetitive cycle of time slots, characterized in that a differentiating circuit is connected to each of said transmitters to permit transfer of a sample of the original signal slope over said highway and a first integrating circuit is connected to each of said receivers to reconstruct the original signal for application to the corresponding receiver upon receipt of a sequence of said signal slope samples from said highway.

9. In a communication system, the combination in accordance with claim 8, characterized in that said gating circuits are enabled at a variable rate in successive cycles of time slots.

10. In a communication system, the combination in accordance with claim 9, characterized in that said signal slope samples are reconstructed by a second integrating circuit in the transmitter of the station generating the original signal and the reconstructed signal is compared with the currently generated signal, the comparison resultant controlling the subsequent operation of said gating circuits.

11. In a multiplex communication system a plurality of transmitters, a plurality of receivers, a common transmission highway, a plurality of gates for for selectively connecting said transmitters and said receivers to said highway during distinct time intervals, means for enabling a pair of said gates during one of said distinct time intervals in each repetitive cycle of time intervals to transfer successive samples of a maximum bandwidth signal between the originating one of said transmitters and the destination one of said receivers via said highway, means for enabling other pairs of said gates at less frequent intervals than said repetitive cycle to transfer signals of less than said maximum bandwidth over said highway, and means responsive to changes in said less than maximum bandwidth signals for controlling said less frequent intervals.

12. In a communication system, a plurality of stations each having a transmitter and a receiver, a common highway and gating circuits for connecting a different one of said transmitters and the receiver with which it is in communication to said common highway during each distinct time slot in a repetitive cycle of time slots, characterized in that successive samples of a maximum bandwidth signal are transmitted over said highway during one of said distinct time slots in each repetitive cycle and successive samples of signals of less than said maximum bandwidth are transmitted over said highway at less frequent intervals than said repetitive cycle, said less frequent intervals corresponding to the rate of change of said less than maximum bandwidth signals.

13. In a communication system, a plurality of stations each having a transmitter and a receiver, a common highway and means for connecting a selected transmitter and the receiver with which it is in communication to said common highway during a distinct time interval in a repetitive cycle of time intervals for transfer of a sequence of signal samples, characterized in that comparison means are connected to said selected transmitter to compare the signal generated in one cycle with the signal sample transferred in the previous cycle, and means are operative upon receipt of an output from said comparison means indicating the difference between said compared signals is less than a predetermined value to block the transfer of a signal sample from said selected transmitter to said common highway during said one cycle.

14. In a multiplex communication system, a plurality of transmitters, a plurality of receivers, a transmission highway, means for transferring a sample of a signal from one of said transmitters to one of said receivers via said highway, means for comparing said sample with the signal currently generated at said one transmitter, and means for inhibiting the transfer of another sample of said signal over said highway until the comparison resultant is of a predetermined magnitude.

15. In a multiplex communication system, the combination in accordance with claim 14 and further comprising differentiating means for producing said signal sample and integrating means connected to said receivers and to said comparison means for reconstructing a portion of the original signal from said signal sample.

References Cited

UNITED STATES PATENTS

| | | |
|---|---|---|
| 2,803,702 | 8/1957 | Ville. |
| 3,311,704 | 3/1967 | Filipowski. |
| 3,441,674 | 4/1969 | Giordano. |

RALPH D. BLAKESLEE, Primary Examiner